April 30, 1929. L. D. KIMMEL 1,711,232
RECEPTACLE CAP
Filed July 11, 1928
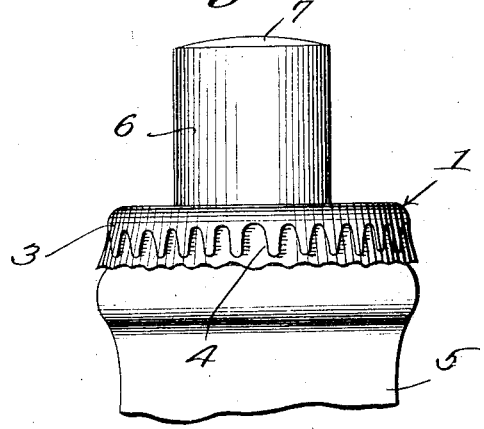
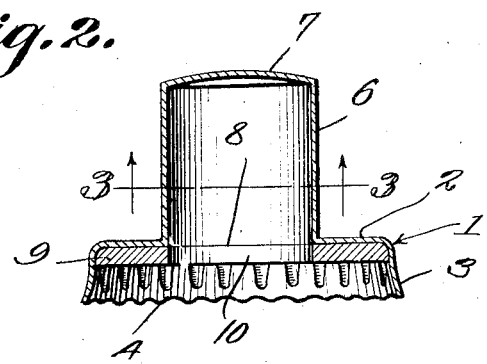
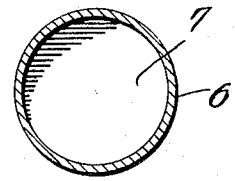
L. D. Kimmel
Inventor
By C. A. Snow & Co.
Attorneys Patented Apr. 30, 1929.

1,711,232

UNITED STATES PATENT OFFICE.

LESLIE D. KIMMEL, OF BLUFFTON, OHIO.

RECEPTACLE CAP.

Application filed July 11, 1928. Serial No. 291,966.

This invention aims to provide a cap for receptacles so constructed that when the receptacle is inverted, the settling and the liquid in the receptacle will accumulate in a reservoir on the cap, the settlings remaining in the reservoir and being carried away when the cap is removed from the receptacle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a portion of a receptacle on which the device forming the subject matter of this application has been mounted;

Figure 2 is a longitudinal section of the device which forms the subject matter of this application;

Figure 3 is a transverse section on the line 3—3 of Figure 2.

The device forming the subject matter of this application comprises a cup shaped cap 1, made of metal, the cap including a disc like body 2 and a rim 3, the rim 3 having the usual corrugations 4 which permit the cap to be crimped down tightly on a receptacle 5, in accordance with a well known practice. The disc like body 2 has a reduced outstanding settling reservoir 6 which preferably is of cylindrical outline, the reservoir 6 being closed at its outer end, as is shown at 7, the end wall 7 being outwardly convexed a little, if desired, as shown in the drawings. At its inner end, the reservoir 6 preferably is open throughout its entire cross section, as indicated at 8.

Within the rim 3 is located the usual gasket 9, which, at present, is made of cork, the gasket 9 abutting against the body 2 of the cap 1 and fitting somewhat closely within the rim 3. The gasket 9 has an opening 10 of approximately the same area as the cross section of the reservoir.

The cap 1 is a placed on the receptacle 5 and the rim 3 is crimped on the receptacle, so as to compress the gasket 9 in a way which will be understood by those skilled in the art, an hermetic closure thus being provided.

If the receptacle is inverted, a sediment or settlings in the liquid will accumulate in the reservoir 6, and when the cap 1 is removed, whatever is held in the reservoir 6 will be carried away with the cap.

The invention is simple but it provides a novel means whereby sediment and settlings which might otherwise impair a beverage, can be removed simply and easily. The device may be used on bottles, jars or receptacle of any kind whatsoever.

What is claimed is:

A device for collecting settlings from a bottle, including a cap provided with a reduced outstanding settling reservoir, the cap having a crimping rim constituting means for connecting the cap to a bottle securely, with the reservoir in communication with all portions of the bottle, whereby the cap will remain in place when the bottle is inverted and permit the settlings from all parts of the bottle to accumulate in the reservoir, and a gasket fitting closely within the crimping rim, to form an hermetic closure, the gasket having an opening which is in comunication with the settling reservoir.

In testimony that I claim the foregoing as my own, I have hereto affixed my signature.

LESLIE D. KIMMEL.